March 22, 1927.
W. H. KAISER
1,621,986
METER CONNECTION
Filed Oct. 23, 1924
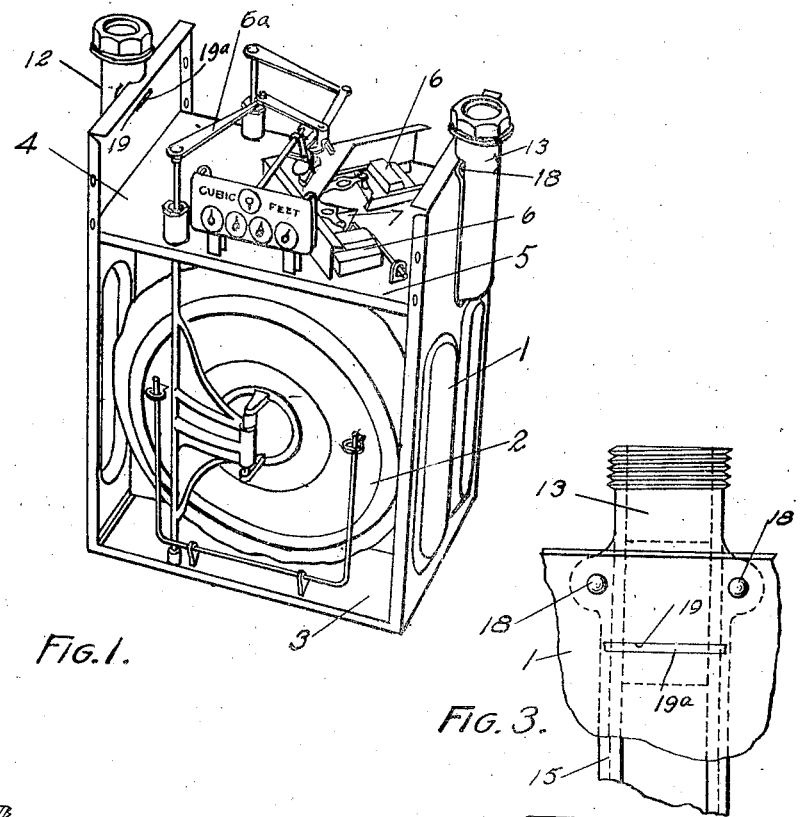
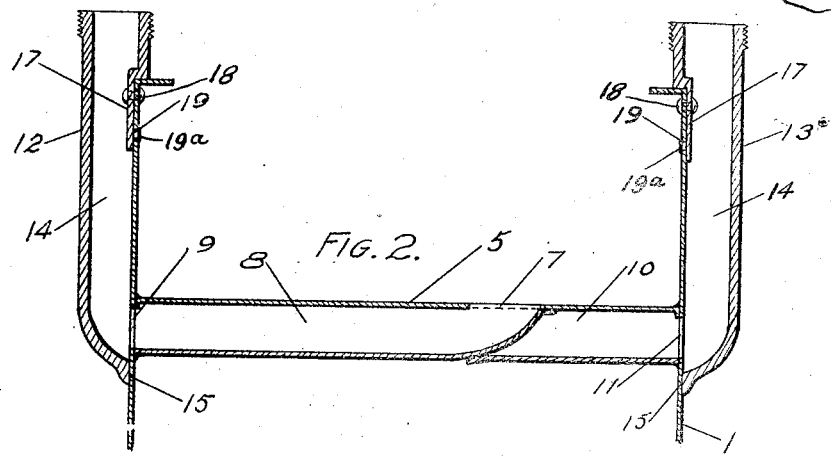
Inventor
William H. Kaiser
By
Attorney

UNITED STATES PATENT OFFICE.

WILLIAM H. KAISER, OF HARBORCREEK TOWNSHIP, PENNSYLVANIA, ASSIGNOR TO AMERICAN METER COMPANY, OF NEW YORK, N. Y., A CORPORATION OF DELAWARE.

METER CONNECTION.

Application filed October 23, 1924. Serial No. 745,485.

This invention is designed to improve the manner of uniting meter connections with the wall of the meter. At present meter connection fittings are formed with open faces which are soldered to the walls of the meter so as to form a connection, the meter wall having an opening leading to the fitting. Ordinarily such fittings have been riveted at the connection end of the fitting to the wall of the meter. It sometimes happens that in securing the gas pipe to the connection sufficient strain is put on the fitting to break the seal between the face of the fitting and the wall of the meter and thus permit a leak from the meter. The present invention is designed to close or prevent the breaking of the seal in this manner.

The invention is illustrated in the accompanying drawings as follows:—

Fig. 1 shows a perspective view of the meter, the front, rear and top walls being removed.

Fig. 2 a central section through the inlet and outlet passages of the meter.

Fig. 3 a view of a part of the inner wall of the meter.

1 marks the meter wall, 2 the diaphragms within the meter chambers 3, and 4 the valve chamber separated from the diaphragm chamber by the wall 5. Valves 6 operate in the usual manner on the separating wall 5 and are actuated by the meter mechanism $6^a$ through the operation of the diaphragm in the usual manner. An opening 7 leads from the valve chamber 4 to a passage 8 terminating in an opening 9 in the wall of the meter. The usual valve ports (not shown) lead to the passage 10 which passage terminates in an opening 11 in the wall of the meter. Fittings 12 and 13, one being the inlet and the other the outlet have the passages 14 formed in them, the fitting being open at one side and provided with a face 15 which surrounds the opening through the side of the fitting. At the top this face is somewhat elongated at 17 and has ears through which rivets 18 are passed for receiving the strain to which the fitting is subjected when the pipes are connected with the meter.

Between the opening in the side of the fitting and the rivets 18 I form a slit 19 extending through the wall of the meter thus exposing the face 15 above the opening in the side.

After the fittings are riveted to the side walls the fitting is soldered to the wall of the meter thus sealing the passage in the fitting. There is no difficulty in forming this initial seal. In order to re-enforce this seal and prevent the breaking of the seal with the slight giving of the rivets under strain I flush the joint with solder $19^a$ through the slit 19 and this forms a dam of sufficient strength to unite the face of the wall with the fitting even though the wall is slightly sprung away from the fitting above the slit, thus preventing any leakage by the slight springing away of the fitting at the top.

What I claim as new is:—

1. In a meter connection, the combination of a meter wall having an opening; a fitting having a connection upper end and having an open side with a surrounding face secured to the meter wall and sealed around the opening in the wall, said wall having a slit above the opening exposing a portion of the face of the fitting; and a sealing means uniting the fitting and the wall at the slit.

2. In a meter connection, the combination of a meter wall having an opening; a fitting having a connection upper end and having an open side with a surrounding face secured to the meter wall and sealed around the opening in the wall, said wall having a slit above the opening in the side of the fitting exposing a portion of the face of the fitting; rivets extending through the fitting and the wall above the slit; and a sealing means uniting the fitting and the wall at the slit.

In testimony whereof I have hereunto set my hand.

WILLIAM H. KAISER.